Oct. 13, 1959 G. H. MULLER ET AL 2,908,324
SEAT VEST JACKET
Filed Jan. 10, 1957 3 Sheets-Sheet 3
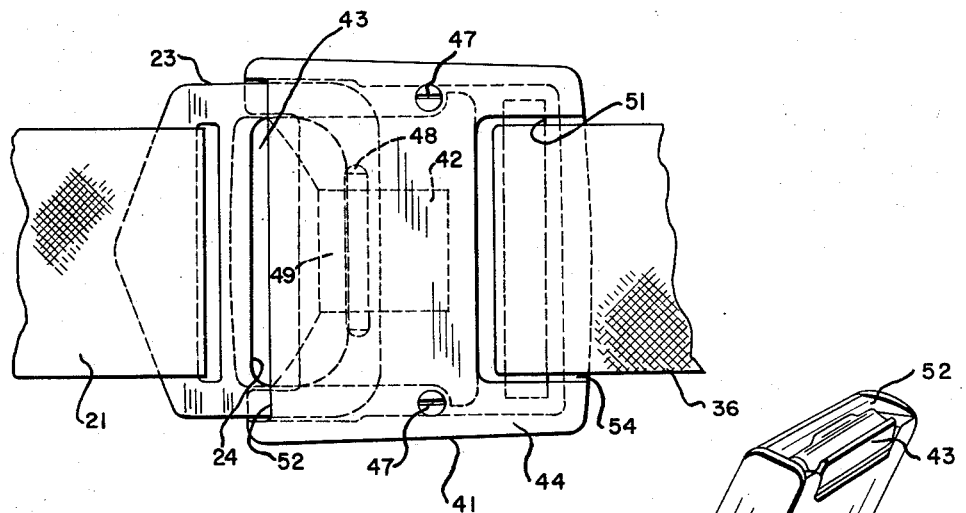
FIG. 5
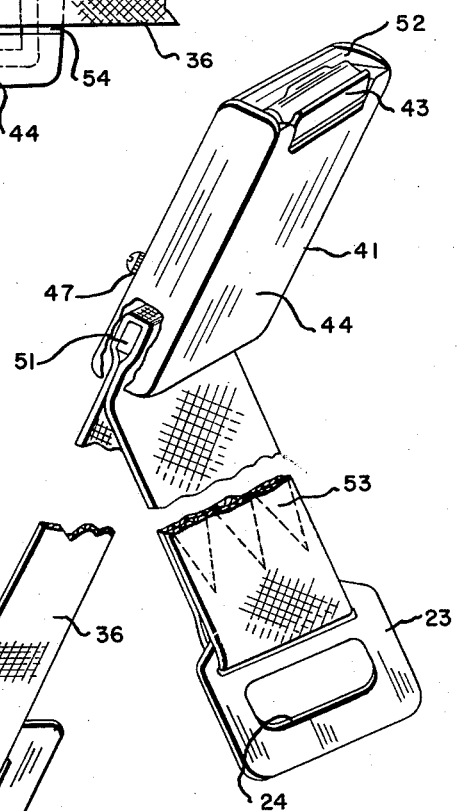
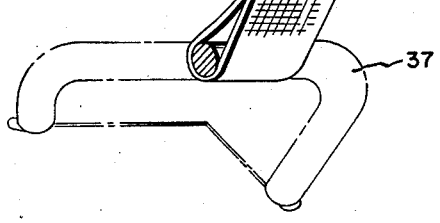
FIG. 4
A.G. SPEAR, JR.
G.H. MULLER
INVENTORS.
BY E.C. McRae
J.R. Faulkner
G.H. Oster
ATTORNEYS United States Patent Office 2,908,324
Patented Oct. 13, 1959

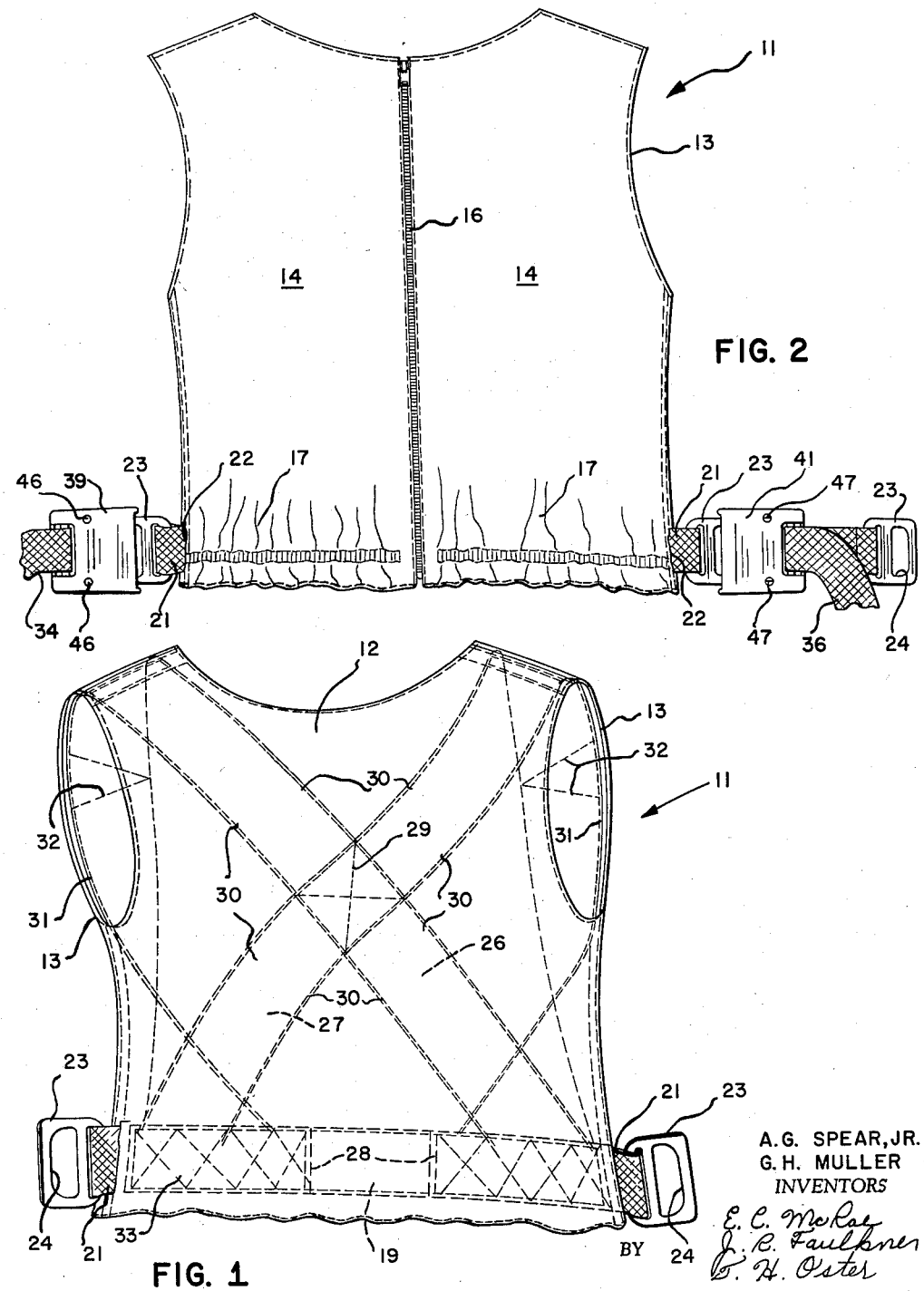

2,908,324

SEAT VEST JACKET

George H. Muller, Northville, and Adrian G. Spear, Jr., Southfield Township, Mich., assignors to Ford Motor Company, Dearborn, Mich., a corporation of Delaware Application January 10, 1957, Serial No. 633,423

8 Claims. (Cl. 155—189)

This invention relates to safety devices and more particularly to a vest type seat belt jacket which may be worn by an infant or child and with which an additional buckle may be secured to the conventional seat belts of a motor vehicle.

One object of this invention is to provide shoulder and waist restraining means fixedly secured within a zippered fabric vest for use by infants and children.

An additional object is to provide a vest having a plurality of reinforcement members which may or may not be formed by the vest fabric itself; and a pair of retainers adjacent the side extremities of the vest for attachment to the seat belts of a vehicle, one of said belts having an additional buckle secured thereon.

A further object is to provide an easily removable vest having a shoulder harness arrangement secured to a heavy waist support with securing means adjacent its outer ends, said jacket having vertically operated quick removal means and expansible means.

Still a further object is to provide a jacket securable to a conventional adult lap seat belt arrangement provided with a retainer receiving buckle on each of the said belts in the vehicle, said jacket being adjustable for use by an infant or child wearing summer or winter clothing.

Other objects and advantages will become more apparent when considered in connection with the accompanying drawings wherein:

Figure 1 is a front elevational view of the jacket embodying the applicant's invention;

Figure 2 is a rear elevational view of the jacket zippered and showing the seat belt buckle attachment;

Figure 4 is a perspective view of the conventional outboard lap seat belt provided with an additional buckle for use with the seat vest; and Figure 5 is an enlarged rear elevational view of the extra buckle assembled to the conventional seat belt and secured to the belt retaining member of the seat vest.

Figure 3:
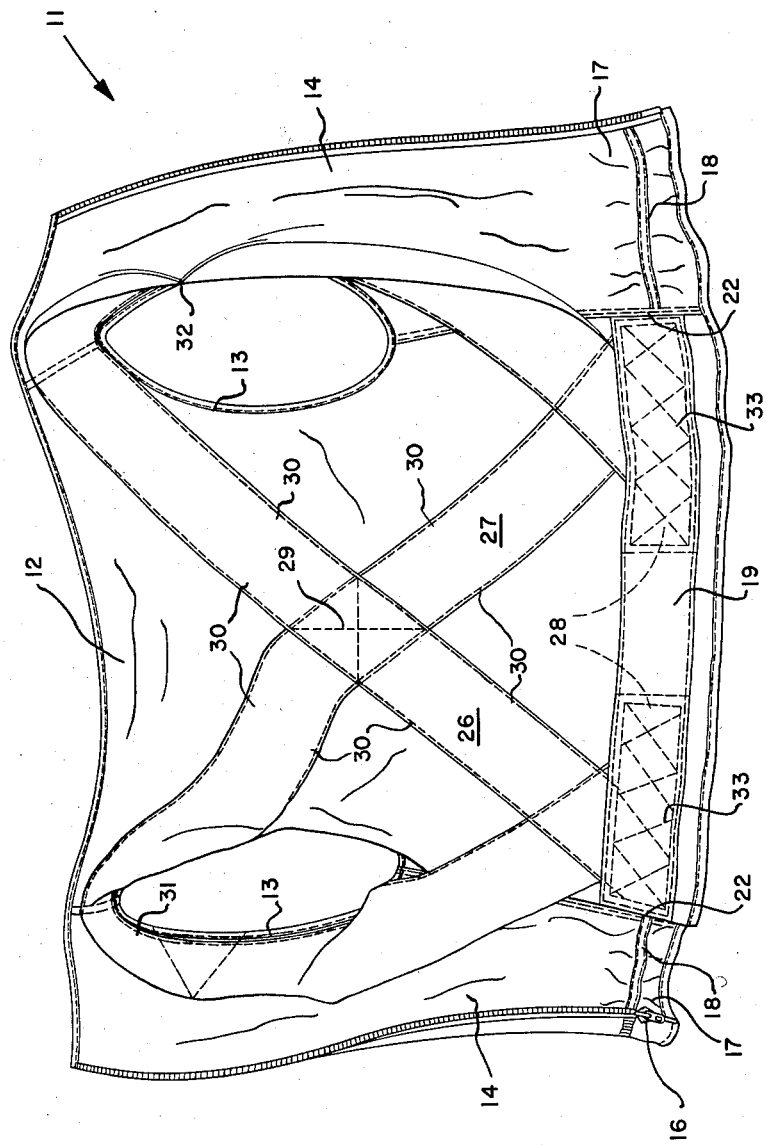
Figure 3 is a rear elevational view of the jacket completely opened and showing the arrangement of the shoulder and waist supports.

Referring now to the drawings, reference numeral 11 indicates generally a seat belt vest for a child or an infant having a closed front 12, arm pits 13 and rear half sections 14 closable by means of a conventional zipper 16. Each of the rear sections 14 has a crimped area indicated at 17 which is secured by an elastic member 18 on the inside of the jacket for providing additional expansion movement such as for a growing child and the wearing of winter clothing. A waist band support 19 extends across the rear of the lower part of the vest and is bent back upon itself to form loops 21 which project through slits 22 provided in the joint between the rear sections 14 and the front section 12 of the vest. A pair of retainers 23 are secured within the loops 21 adjacent the side of the vest and are provided with a closed generally semispherical slot 24 for insertion in a conventional belt buckle. Prior to securing the waist band support 19 to the rear of the front 12, a pair of shoulder supports 26 and 27 starting at the extreme corner of the vest and interposed between the bent back section 28 of the support 19, diagonally cross and are stitched to the jacket front at 29 and proceed about the arm pits 13 and are then secured in cross fashion to the beginning of the other cross belt adjacent the waist band 19. As can be seen in Figures 1 and 3, the section of the shoulder supports 26 and 27 secured to the back of the front 12 is stitched on both edges indicated at 30 while only stitched on the inner side indicated at 31 when going around the arm pits 13. A V-shaped stitching 32 keeps the rear section of the belt secured to the jacket rear sections 14. A further and extensive stitching indicated at 33 secures the waist band support and the cross supports 26 and 27 to the jacket front 14.

In the manufacture of the various supports for the fabric vest, the waist band 19 may be made from nylon webbing similar to the webbing used in the conventional seat belts and having a tensile strength of 4000 p.s.i. On the other hand, the shoulder harness supports 26 and 27 are made from a lighter nylon webbing having about a tensile strength of 1200 pounds. It is to be noted that the placement of the zipper on the rear portion of the vest does not in any way form a structural part of the vest.

The normal installation of said belts such as may be used by the front seat passenger, would include, for example, a pair of seat belts 34 and 36 secured to a pair of anchors 37 by brackets 38 (of which only one is shown). Inboard seat belt 34 is provided with a commercially available plunger type buckle 39 while the outboard seat belt 36 is provided with a retainer 23 which is, of course, insertable in the buckle 39 when used conventionally by an adult. When the seat vest 11 is to be used, an additional buckle 41 is required. Both buckles 39 and 41 are identical in that a flat bent spring 42 biases the tongue 43, but differ in that the tongue is anchored in the hollowed body 44 by knockout pins 46 in buckle 39 and by threaded shoulder bolts 47 in buckle 41. Tongue 43 has a vertical elliptical slot 48 and a raised inner section 49 ending at the slot 48 so that the raised section 49 is contained within the slot 24 of the retainer 23 (as shown in Figure 5) thus securing the retainer within the buckle. A slidable belt securing adjustment bar 51 is located rearwardly of the tongue 43 around which the belt is threaded. Because it is unhandy and time consuming to remove the seat belt 36 from around the floor anchor 37 and hand thread it around the bar 51, threaded shoulder bolts 47 are used in place of pins 46. The bolts 47 are removed permitting the spring 42, tongue 43 and adjustment bar 51 to be removed through the front opening 52. The belt 36 is then looped around the adjustment bar 51 and pulled back into the buckle body 44. The spring 42 and tongue 43 are then reinserted into the body 44 and the shoulder bolts 47 threadably engaged in the body (as shown in Figure 5). In the particular commercially available buckle used herein, it can be seen that the effective pull on the forward end of the belt 53 will permit buckle adjustment with respect to its position on the belt 36. A pull on the buckle or belt 36 will, of course, move the adjustment bar 51 rearwardly effectively squeezing the forward end of the belt 53 against the vertical edge 54 of the buckle body 44. Figures 2 and 4 show how the simple addition of the easily mountable buckle 41 permits the use of the seat vest in an automobile equipped with conventional seat belts. When the jacket 11 is not used, the buckle 41 may be slidably moved down the belt 36 toward the anchor 38 and out of the way.

As can be seen, a more positive type of holding means, a seat belt vest, is provided for a youngster in which the shoulder strap supports cooperate with a waist band support to secure the youngster from being thrown upwards. The fabric of the vest may be of a linen or other material which will not be too warm and uncomfortable in the summer time. Although the jacket has been described with particular reference to an infant or child, it is obvious that it may be large enough to be worn by an adult and, of course, may be made in varying sizes. The cross supports may also be varied in thickness to give the tensile strength desired.

It is to be understood that the invention is not to be limited to the exact construction shown and described, but that certain departures can be made without departing from my invention. For instance, the substitution of different commercially available plunger type buckles may be made. Also, it is possible to use other means of closing the vest about the person's torso such as by buttons and hooks and the closure means may be positioned on the side of the vest to permit the user, an adult for example, to readily remove the vest.

What is claimed is:

1. A body restraining arrangement for motor vehicles and the like having a pair of secured seat belts, said seat belts having locking means adjacent their free ends, comprising in combination a removable cloth vest, said vest having a full front portion and a pair of rear portions having their outer sides connected to the sides of the front portion and defining a pair of arm holes and a neck hole, means for selectively joining the rear portions at their inner sides, a horizontally disposed waist support secured to the front portion and extending exteriorly of the front portion, a pair of seat belt retainers secured to the outer ends of the waist support adjacent the outer sides of the front portion, a pair of shoulder restraining straps secured to the waist band support and the front and rear sides respectively, whereby said vest is secured to the seat belts by engaging the respective locking means on the seat belts to the respective retainers on the waist support.

2. The structure defined by claim 1 which is further characterized in that each of said rear portions has a vertically crimped area secured by an elastic member whereby said vest is adaptable for a number of different size persons.

3. The structure defined by claim 1 which is further characterized in that said rear portions are secured to the front portion with a slot defined therebetween and said waist band support is secured to the inside of the front portion and has its ends projecting through said slots exteriorly of the front portion.

4. A seat vest for use with a pair of seat belts in a motor vehicle and the like comprising in combination a fabric type vest having a front and rear portion adapted to encircle a person's upper trunk, said vest having access apertures for the arms and the neck, means for selectively opening said vest for securement about a person's upper trunk, a horizontally disposed front support extending slightly exteriorly of the vest and secured to the vest, a pair of retainers fixedly secured to the extended ends of the front support, a pair of shoulder supports secured initially between the front portion and the front support adjacent each end of the support and diagonally criss-crossed on the front portion to substantially encircle the arm hole and then secured between the front portion and the front support at the opposite end of the front support, said seat belts having locking means adapted to engage said retainers and positively fasten the seat vest to the vehicle seat belts.

5. The structure defined by claim 4 which is further characterized in that said front support is substantially greater in strength than said shoulder supports, said shoulder supports being secured at their side edges to the front portion of the vest and at the side adjacent the arm holes on the vest rear portions, said shoulder supports having their initial starting ends criss-crossing at the terminating end of the other shoulder supports thereby providing a seat vest having integral supports.

6. A child's seat vest jacket for use in a motor vehicle and the like having a pair of secured seat belts, said seat belts having a locking mechanism on the free end of one of the belts and a retainer on the end of the other belt adapted to be engaged by said locking mechanism, said seat vest jacket having an unbroken front section and a pair of like rear sections secured substantially along their outer sides to the sides of the front section and defining a slit between said rear sections and front section respectively, means for detachably joining the rear sections at their inner ends to provide an encircling vest with defined arm holes and neck holes, a waist band support secured to the inside of the front section substantially aligned with the slit between the front and rear sections respectively and extending through said slit and forming a loop adjacent the outside of the vest, a pair of retainers secured within said loops, a pair of criss-crossed shoulder straps secured to the inside of the front and rear sections of the seat vest jacket and substantially surrounding the arm holes, said shoulder straps being interposed between the waist support and the front section at their loose ends and secured to said front section and waist band support, an additional locking mechanism mounted to said seat belt having the retainer, whereby the seat vest jacket may be secured to the seat belts by engaging the locking mechanisms with the respective retainers on the waist band support.

7. The structure defined by claim 6 which is further characterized in that said additional locking mechanism is provided with quick detachable screw means whereby the locking mechanism may be disassembled and reassembled to the secured seat belt in the vehicle without disturbing the seat belt attachment to the vehicle.

8. A body restraining device for motor vehicles and the like having a pair of secured seat belts, said seat belts having locking means adjacent their free ends, comprising in combination a body encircling vest-like garment, said garment having a waist band support secured to the front portion of the garment and extending outwardly of said garment, additional locking means at the ends of said waist band support for selectively engaging the seat belt locking means, a pair of criss-crossed straps secured to the waist band support and to the garment and arranged to encircle and restrain the shoulders of a person when said waist band support locking means are engaged with said seat belt locking means.

References Cited in the file of this patent

UNITED STATES PATENTS

| 1,369,456 | Merdith | Feb. 22, 1921 |
| 1,529,165 | Carroll | Mar. 10, 1923 |
| 2,414,698 | Picard | Jan. 21, 1947 |
| 2,448,076 | Bradley | Aug. 31, 1948 |
| 2,449,741 | Fitzpatrick | Sept. 21, 1948 |
| 2,498,471 | Williams | Feb. 21, 1950 |
| 2,563,766 | Weinstiein et al. | Aug. 7, 1951 |
| 2,664,140 | Kindelberger | Dec. 29, 1953 |
| 2,798,539 | Johnson | July 9, 1957 |
| 2,827,989 | Thompson | Mar. 25, 1958 |